United States Patent
Ivanov et al.

(10) Patent No.: US 8,253,389 B2
(45) Date of Patent: Aug. 28, 2012

(54) BATTERY PROTECTION CIRCUIT AND METHOD FOR ENERGY HARVESTER CIRCUIT

(75) Inventors: Vadim V. Ivanov, Tucson, AZ (US); Kevin A. Scoones, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 373 days.

(21) Appl. No.: 12/658,879

(22) Filed: Feb. 17, 2010

(65) Prior Publication Data

US 2011/0199057 A1   Aug. 18, 2011

(51) Int. Cl.
*H02J 7/04* (2006.01)
*H02J 1/00* (2006.01)
*H02H 7/10* (2006.01)

(52) U.S. Cl. ............... 320/162; 307/80; 307/85; 363/50

(58) Field of Classification Search .................. 320/162; 307/80; 363/50

See application file for complete search history.

(56) References Cited

U.S. PATENT DOCUMENTS

| | | | | |
|---|---|---|---|---|
| 5,982,144 A | * | 11/1999 | Johnson et al. | ............... 320/122 |
| 6,239,584 B1 | | 5/2001 | Jang et al. | |
| 6,943,529 B2 | * | 9/2005 | Cheiky et al. | ................. 320/162 |
| 2008/0048620 A1 | | 2/2008 | Zhang | |
| 2009/0206657 A1 | | 8/2009 | Vuk et al. | |
| 2009/0251099 A1 | * | 10/2009 | Brantner et al. | ............. 320/101 |
| 2009/0309538 A1 | | 12/2009 | Xu | |
| 2010/0244573 A1 | * | 9/2010 | Karnick et al. | ................. 307/80 |

OTHER PUBLICATIONS

PCT Search Report mailed Jun. 15, 2011.

* cited by examiner

*Primary Examiner* — M'Baye Diao
(74) *Attorney, Agent, or Firm* — William B. Kempler; Wade J. Brady, III; Frederick J. Telecky, Jr.

(57) ABSTRACT

Power management circuitry (7-2,3,4) for converting a harvested voltage ($V_{hrv}$) to an output voltage ($V_{BAT}$) applied to a battery (6) includes an inductor (L0) having a first terminal (3) coupled to receive the harvested voltage ($V_{hrv}$) and a second terminal coupled to a first terminal of a first switch (S0). The power management circuitry transfers the current generated by an energy harvester (2) to the battery if it (6) is not fully charged, and shunts the current away from the battery (6) to avoid overcharging if it is fully charged.

20 Claims, 3 Drawing Sheets

US 8,253,389 B2

BATTERY PROTECTION CIRCUIT AND METHOD FOR ENERGY HARVESTER CIRCUIT

BACKGROUND OF THE INVENTION

The present invention relates generally to energy harvesters, such as vibration energy harvesters, for scavenging or harvesting very low levels of energy, and more particularly to circuits and methods for protecting batteries or supercapacitors in which the harvested energy is stored. The invention also relates to circuits and methods for preventing surge current damage to inductors and/or other circuit components in DC-DC converter circuits or other power management circuitry that receives energy from the outputs of energy harvesters.

Various very low power, i.e., "nano-power", integrated circuits that require extremely low amounts of operating current have been developed which can be powered by very small amounts of power scavenged or harvested from ambient solar, vibrational, thermal, and/or biological energy sources by means of micro-energy harvesting devices and then stored in batteries or supercapacitors. (The term "nano-power" as used herein is intended to encompass circuits and/or circuit components which draw DC current of less than roughly 1 microampere.) The amount of energy available from a harvester usually is small and unpredictable, so intermediate energy storage is often required in these applications to provide for system power needs when energy from the harvester is unavailable or insufficient. Lithium batteries or supercapacitors are commonly used for such intermediate energy storage.

Prior Art FIG. 1 shows a circuit 1 including an energy harvester 2 which produces a DC voltage $V_{hrv}$ on a conductor 3 that is connected to one terminal of a large filter capacitor C0 and to the input of a conventional boost converter 7-1. Boost converter 7-1 includes an inductor L0 coupled between $V_{hrv}$ and conductor 4, which is connected to one terminal of a switch S0 and to the anode of a diode D0. The other terminal of switch S0 is connected to ground. The cathode of diode D0 is connected by conductor 5 to the (+) terminal of a battery or supercapacitor 6.

Suitable power management circuitry for energy harvester 2 controls switch S0 so as to provide charging of battery/supercapacitor 6 when energy is available from harvester 2 if battery/supercapacitor 6 is not fully charged to its maximum or fully-charged voltage $V_{BAT(max)}$. (For a typical lithium battery, $V_{BAT(max)}$ is 4.5 volts.)

If battery 6 is fully charged to $V_{BAT(max)}$, then further charging may permanently damage it. In the unprotected system of Prior Art FIG. 1 there is nothing to prevent current from harvester 2 from overcharging battery/supercapacitor 6. However, the output voltage $V_{hrv}$ generated by harvester 2 should be limited to a value below $V_{BAT(max)}$ to prevent damage to the battery/supercapacitor. Furthermore, such limiting of $V_{hrv}$ should prevent surge currents supplied by charged-up filter capacitor C0 from damaging circuit components such as inductor L0 and/or other circuit components in the power management circuitry.

Thus, there is an unmet need for a circuit and method for protecting batteries or supercapacitors in which harvested energy is stored.

There also is an unmet need for a circuit and method for preventing surge current damage to inductors in DC-DC converter circuits coupled to an energy harvester.

There also is an unmet need for a circuit and method for both protecting batteries or supercapacitors in which harvested energy is stored and preventing surge current damage to inductors in DC-DC converter circuits coupled to an energy harvester.

SUMMARY OF THE INVENTION

It is an object of the invention to provide a circuit and method for protecting batteries or supercapacitors in which harvested energy is stored.

It is another object of the invention to provide a circuit and method for preventing surge current damage to inductors and/or other components in DC-DC converter circuits coupled to an energy harvester.

It is another object of the invention to provide a circuit and method for both protecting batteries or supercapacitors in which harvested energy is stored and preventing surge current damage to inductors and/or other components in DC-DC converter circuits coupled to an energy harvester.

Briefly described, and in accordance with one embodiment, the present invention provides power management circuitry (7-2,3,4) for converting a harvested voltage ($V_{hrv}$) to an output voltage ($V_{BAT}$) applied to an energy storage device (6) that includes an inductor (L0) having a first terminal (3) coupled to receive the harvested voltage ($V_{hrv}$) and a second terminal coupled to a first terminal of a first switch (S0). The power management circuitry transfers the current generated by an energy harvester (2) to the energy storage device if it is not fully charged, and shunts the current away from the energy storage device (6) to avoid overcharging it if it is fully charged.

In one embodiment, the invention provides an energy harvesting system (10-1,2,3) including an energy harvester (2) for generating a harvested voltage ($V_{hrv}$) and an energy management circuit (7-2,3,4) for converting the harvested voltage ($V_{hrv}$) to an output voltage ($V_{BAT}$). The energy management circuit (7-2,3,4) includes an inductor (L0) having a first terminal (3) coupled to receive the harvested voltage ($V_{hrv}$) and a second terminal (4) coupled to a first terminal of a first switch (S0). An energy storage device (6) is coupled to receive the output voltage ($V_{BAT}$). Protection circuitry (S0a, $R_S$ in FIG. 2; S1,$R_S$,15-1,2 in FIG. 3,4) in the energy management circuit (7-2,3,4) shunts current generated by the energy harvester (2) away from the energy storage device (6) if the energy storage device (6) is fully charged. The energy management circuit (7-2,3,4) includes a control circuit (15-1,2) coupled to a control terminal of the first switch (S0).

In one embodiment, the energy management circuit (7-3,4) includes a second switch (S1) coupled in parallel with the energy harvester (2) to perform the shunting, and the second switch (S1) has a control terminal coupled to the control circuit (15-1,2) to control the shunting. In one embodiment, a first terminal of the second switch (S1) is coupled to a first reference voltage (GND), a second terminal of the second switch (S1) is coupled to a first terminal of a current-limiting resistor ($R_S$), and a second terminal of the current-limiting resistor ($R_S$) is coupled to the first terminal (3) of the inductor (L0). In one embodiment, the energy harvesting system includes a filter capacitor (C0) coupled in parallel with the energy harvester (2). In one embodiment, the energy management circuit (7-2,3,4) includes a rectifying element (D0) coupled between the second terminal (4) of the inductor (L0) and the output voltage ($V_{BAT}$). In a described embodiment, the energy management circuit (7-2,3,4) includes a boost converter.

In one embodiment, the control circuit (15-1,2) is coupled to receive the harvested voltage ($V_{hrv}$) and the output voltage ($V_{BAT}$) and operates to compare the output voltage ($V_{BAT}$) to a maximum energy storage device reference voltage ($V_{BAT(max)}$ to determine whether the energy storage device (6) is fully charged, and also operates to maintain the first switch (S0) open and the second switch (S1) closed to shunt the current generated by the energy harvester (2) away from the inductor (L0) and the energy storage device (6) if the energy storage device (6) is fully charged. In one embodiment, the control circuit (15-1,2) operates to compare the harvested voltage ($V_{hrv}$) to the output voltage ($V_{BAT}$), maintain the second switch (S1) open, and operate the first switch (S0) so as to effectuate boosting of the harvested voltage ($V_{hrv}$) by the energy management circuit (7-2,3,4) if the harvested voltage ($V_{hrv}$) is less than the output voltage ($V_{BAT}$).

In a described embodiment, the control circuit (15-1,2) operates to maintain the first (S0) and second (S1) switches open if the harvested voltage ($V_{hrv}$) is less than the output voltage ($V_{BAT}$) and the energy storage device (6) is less than fully charged.

In a described embodiment, the control circuit (15-2) includes a comparator (12) having a first input (−) coupled to receive the harvested voltage ($V_{hrv}$), a second input (+) coupled to receive a voltage (50) indicating that the energy storage device (6) is fully charged, and an output coupled to the control terminal of the second switch (S1), and wherein the control circuit (15-2) includes an amplifier (17) having a first input (−) coupled to receive the output voltage ($V_{BAT}$), a second input (+) coupled to receive the maximum energy storage device reference voltage ($V_{BAT(max)}$), and an output coupled by means of a pulse width modulation (PWM) circuit (42) to the control terminal of the first switch (S0).

In a described embodiment, the energy management circuit (7-2) includes a second switch (S0a) coupled in parallel with the first switch (S0) to perform the shunting. The second switch (S0a) has a control terminal coupled to the control circuit (15-1) to control the shunting. A first terminal of the second switch (S0a) is coupled to a first reference voltage (GND), and a second terminal of the second switch (S0a) is coupled to the second terminal (4) of the inductor (L0).

In one embodiment, a current-limiting resistor ($R_S$) couples the second terminal of the second switch (S0a) to the second terminal (4) of the inductor (L0), and the control circuit (15-1) is coupled to receive the harvested voltage ($V_{hrv}$) and the output voltage ($V_{BAT}$) and operates to compare the output voltage ($V_{BAT}$) to a maximum energy storage device reference voltage ($V_{BAT(max)}$) to determine whether the energy storage device (6) is fully charged. The control circuit (15-1) also operates to maintain the first switch (S0) open and the second switch (S0a) closed to shunt the current generated by the energy harvester (2) away from the energy storage device (6) if the energy storage device (6) is fully charged.

In one embodiment, the control circuit (15-1) operates to compare the harvested voltage ($V_{hrv}$) to the output voltage ($V_{BAT}$), and maintains the second switch (S0a) open and operates the first switch (S0) so as to effectuate boosting of the harvested voltage ($V_{hrv}$) by the energy management circuit (7-2) if the harvested voltage ($V_{hrv}$) is less than the output voltage ($V_{BAT}$).

In one embodiment, the invention provides a method for harvesting energy from an energy harvester (2) to generate a harvested voltage ($V_{hrv}$), the method including converting the harvested voltage ($V_{hrv}$) to an output voltage ($V_{BAT}$) applied to an energy storage device (6) by means of an energy management circuit (7-2,3,4) including an inductor (L0) having a first terminal (3) coupled to receive the harvested voltage ($V_{hrv}$) and a second terminal (4) coupled to a first terminal of a first switch (S0); transferring current generated by the energy harvester (2) to the energy storage device (6) by means of the energy management circuit (7-2,3,4) if the energy storage device (6) is not fully charged; and shunting the current generated by the energy harvester (2) away from the energy storage device (6) to avoid overcharging the energy storage device (6) if it is fully charged.

In one embodiment, the method includes shunting the current generated by the energy harvester (2) away from the inductor (L0). In one embodiment, the method includes coupling the first terminal (3) of the inductor (L0) through a current-limiting resistor ($R_S$) and a second switch (S1) coupled in parallel with the energy harvester (2) to a reference voltage (GND). In one embodiment, the method includes coupling the second terminal (4) of the inductor (L0) through a current-limiting resistor ($R_S$) and a second switch (S0a) to a reference voltage (GND). In one embodiment, the method includes operating a control circuit (15-1,2) to maintain the first switch (S0) open and the second switch (Sa) closed if the harvested voltage ($V_{hrv}$) is greater than the output voltage ($V_{BAT}$).

In one embodiment, the invention provides a system for harvesting from an energy harvester (2) to generate a DC harvested voltage ($V_{hrv}$), including means (7-1,2) for converting the harvested voltage ($V_{hrv}$) to an output voltage ($V_{BAT}$) applied to an energy storage device (6) by means of an energy management circuit (7-2,3,4) including an inductor (L0) having a first terminal (3) coupled to receive the harvested voltage ($V_{hrv}$) and a second terminal (4) coupled to a first terminal of a first switch (S0); means (L0,15-1,D0) for transferring current generated by the energy harvester (2) to the energy storage device (6) by means of the energy management circuit (7-2,3,4) if the energy storage device (6) is not fully charged; and means (15-1,2; S1; $R_S$; S0a) for shunting the current generated by the energy harvester (2) away from the energy storage device (6) to avoid overcharging the energy storage device (6) if it is fully charged.

DETAILED DESCRIPTION OF THE PREFERRED EMBODIMENTS

Figure 2:
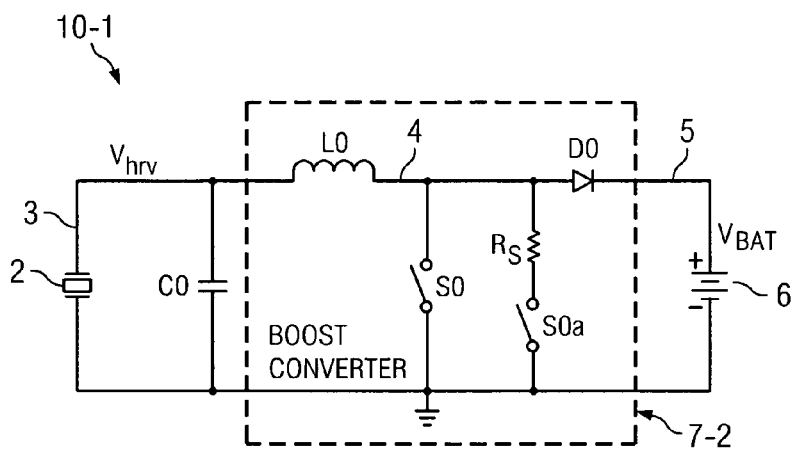
FIG. 2 is a schematic diagram including a first circuit for preventing overcharging of the battery in FIG. 1 while also preventing damage to the inductor.

FIG. 2 shows a circuit 10-1 including energy harvester 2 which produces a harvested voltage $V_{hrv}$ on a conductor 3. ($V_{hrv}$ either is a DC voltage generated by a suitable rectifier that rectifies AC energy generated by a harvester such as an inductive or piezo electric harvester, or is a DC voltage directly generated by a harvester such as a thermopile harvester or a solar cell harvester.) Conductor 3 is connected to one terminal of filter capacitor C0 and also to the input of a conventional boost converter 7-2. The other terminal of capacitor C0 is connected to ground. Boost converter 7-2 can be considered to be a power management circuit that controls the flow of harvested energy from conductor 4 to battery/supercapacitor 6 and/or a load.

Boost converter 7-2 includes inductor L0 coupled between conductor 3 and conductor 4. As in Prior Art FIG. 1, conductor 4 in FIG. 2 is connected to one terminal of switch S0 and to the anode of diode D0. The other terminal of switch S0 is connected to ground. The cathode of diode D0 is connected by output conductor 5 to the (+) terminal of battery or supercapacitor 6, hereinafter referred to simply as battery 6.

In accordance with one embodiment of the present invention, an additional switch S0a is coupled between ground and one terminal of a current-limiting resistor $R_S$. A second terminal of current-limiting resistor $R_S$ is connected to conductor 4. Current limiting resistor $R_S$ may have a resistance of a few megohms. Switches S0 and S0a are controlled by a suitable boost control circuit, subsequently described, which compares $V_{BAT}$ with $V_{BAT(max)}$ to determine whether battery 6 is fully charged. The boost controller circuit also determines if $V_{hrv}$ is greater than $V_{SAT}$.

It should be appreciated that filter capacitor C0 typically may have a capacitance of roughly 1 μF. Therefore, even though the power available from harvester 2 is very low, if filter capacitor C0 is charged up and switch S0 then is closed, a very large surge of current will be supplied by capacitor C0 through inductor L0. The large surge current would be likely to destroy or seriously damage inductor L0.

Figure 1:
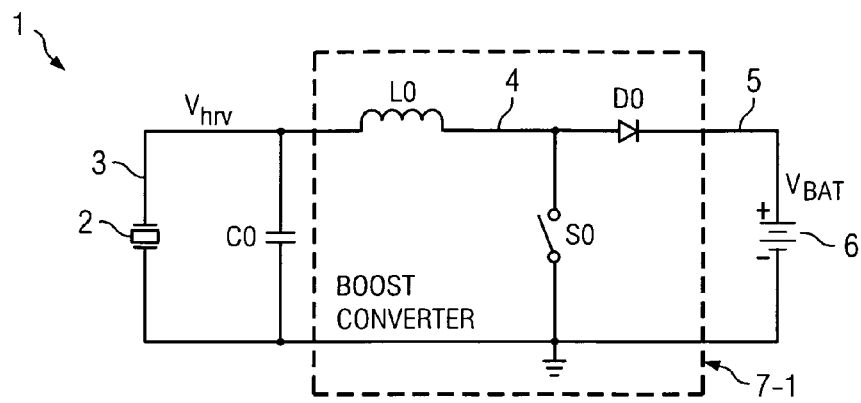
FIG. 1 is a schematic diagram of a conventional boost converter coupled to an energy harvester, for charging a battery or supercapacitor.

Note that switch S0 in Prior Art FIG. 1 is a large, low-resistance switch, and it would be possible to provide a gate driver circuit for an MOS transistor implementation of switch S0. In this case, the gate driver circuit could limit the gate drive voltage of the transistor switch so as to provide a higher ON resistance of switch S0, as an alternative to providing current-limiting resistor $R_S$ and switch S0a as in FIG. 2. In this case, switch S0 could be closed when battery 6 is fully charged and its higher ON resistance would prevent overcharging of battery 6 and also prevent damage to inductor L0 by a current surge from filter capacitor C0.

Figure 3:
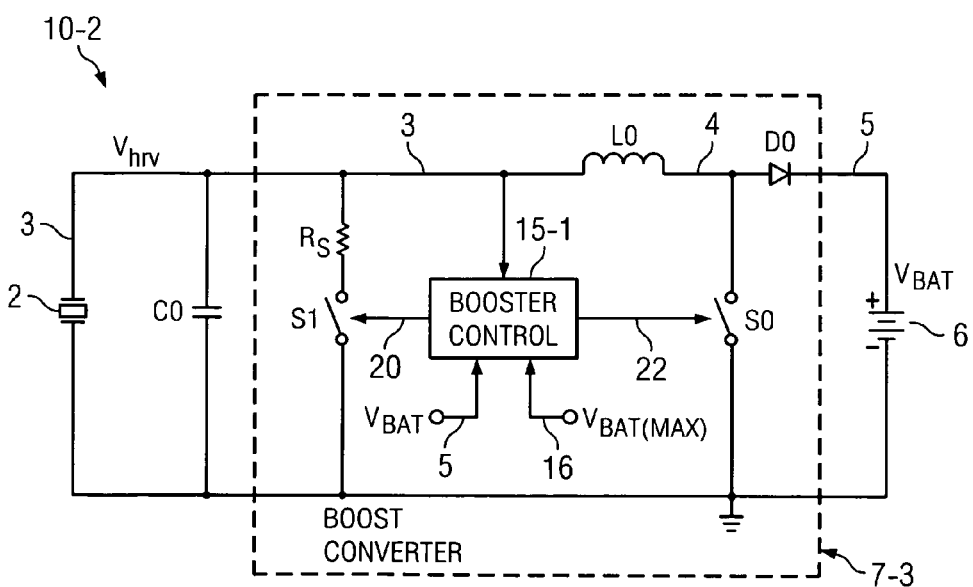
FIG. 3 is a schematic diagram including a second circuit for preventing overcharging of the battery in FIG. 1 while also preventing damage to the inductor.

FIG. 3 shows another embodiment of the invention. As in FIG. 2, circuit 10-2 in FIG. 3 includes energy harvester 2 which produces harvested voltage $V_{hrv}$ on conductor 3. Conductor 3 is connected to one terminal of filter capacitor C0 and also to the input of a conventional boost converter 7-3. The other terminal of capacitor C0 is connected to ground. Boost converter 7-3 can be considered to be a power management circuit that controls the flow of harvested energy from conductor 4 to battery 6 and/or a load. Boost converter 7-3 includes inductor L0 coupled between conductor 3 and conductor 4. Conductor 4 is connected to one terminal of switch S0 and to the anode of diode D0. The other terminal of switch S0 is connected to ground. The cathode of diode D0 is connected by output conductor 5 to the (+) terminal of battery 6.

In accordance with another embodiment of the invention, switch S1 in FIG. 3 is coupled between ground and one terminal of current-limiting resistor $R_S$. A second terminal of current-limiting resistor $R_S$ is connected to conductor 3. A booster control circuit 15-1 has an output 20 connected to the control terminal of switch S1 and another output 22 connected to the control terminal of switch S0. Booster control circuit 15-1 has inputs connected to receive the harvester output voltage $V_{hrv}$ on conductor 3, the battery voltage $V_{BAT}$ on conductor 5, and a reference voltage $V_{BAT(max)}$ that represents the fully-charged value of $V_{BAT}$.

Switches S0 and S1 are controlled by boost control circuit 15-1, which compares $V_{BAT}$ with $V_{BAT}(max)$ to determine whether battery 6 is fully charged. If battery 6 is fully charged, then boost control circuit 15-1 also determines if $V_{hrv}$ is greater than $V_{BAT}$. Booster control circuit 15-1 operates in accordance with the flow chart of FIG. 5.

Figure 5:
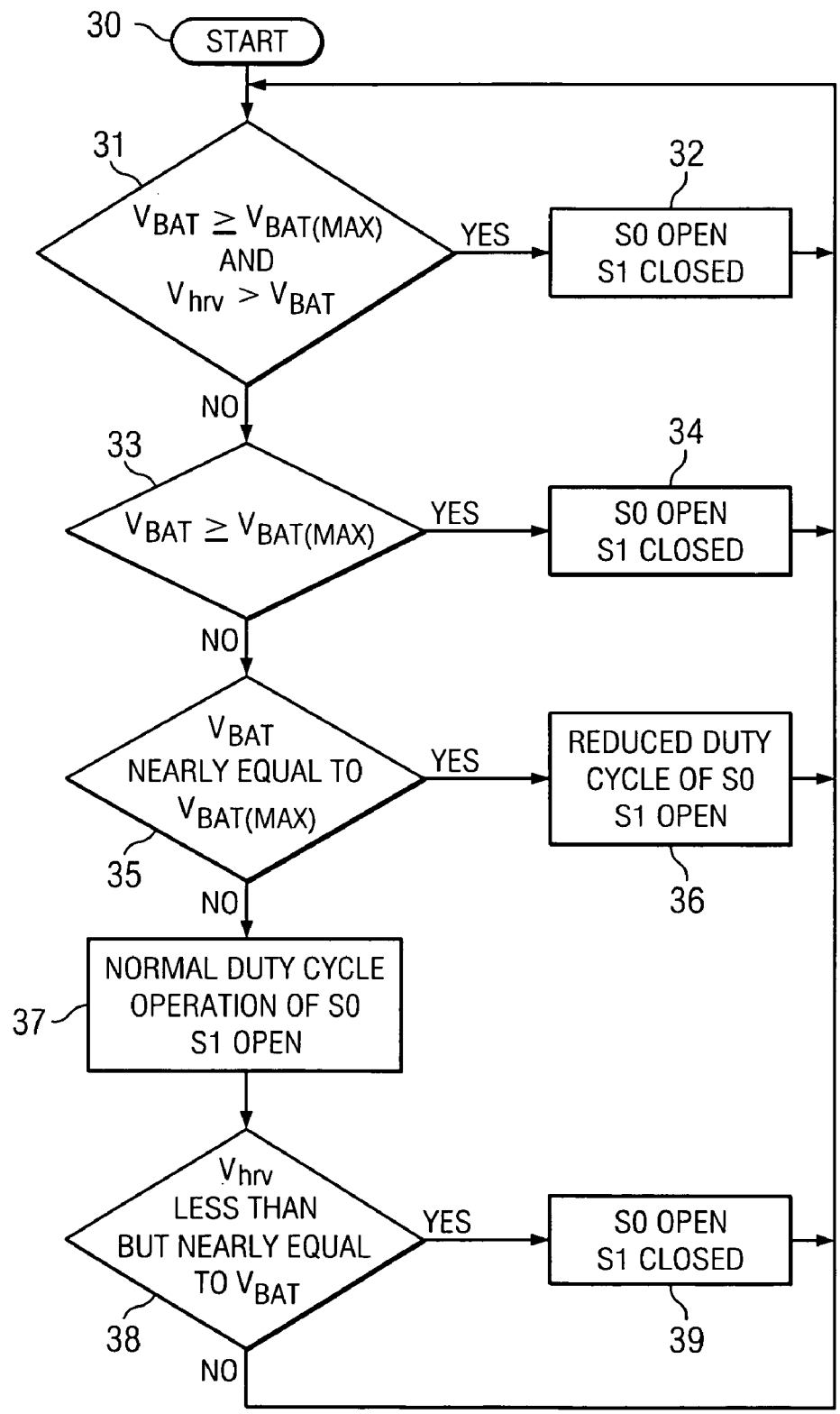
FIG. 5 is a flowchart of the operation of the boost control circuit in of FIGS. 3 and 4.

Referring to decision block 31 in FIG. 5, boost control circuit 15-1 determines if both: (1) $V_{hrv}$ is greater than $V_{BAT}$, and (2) $V_{BAT}$ is greater than or equal to $V_{BAT(max)}$. If this determination is affirmative, then boost control circuit 15-1 maintains switch S0 open, and also maintains switch S1 closed to prevent harvested current from overcharging the fully-charged battery 6 and to prevent surge currents supplied by filter capacitor C0 from damaging inductor L0 or battery 6. Maintaining switch S1 closed has the effect of directing all of the energy stored in filter capacitor C0 and all of the energy being generated by harvester 2 through current-limiting resistor $R_S$ and switch S1 as long as battery 6 remains fully charged. (It should be appreciated that in the described energy harvesting applications, the amount of energy stored in filter capacitor C0 and the amount of energy being generated by harvester 2 are relatively low, so there is little danger of switch S1 being damaged by current therein. However, if the input of boost converter 7-3 is connected to a sufficiently large energy source, switch S1 would be destroyed.) The algorithm of FIG. 5 goes from block 32 to the entry point of decision block 31 and continues to monitor the value of $V_{BAT}$.

If the determination of decision block 31 is negative, then boost control circuit 15-1 determines whether $V_{BAT}$ exceeds $V_{BAT(max)}$, as indicated in decision block 33. If the determination of decision block 33 is affirmative, boost control circuit 15-1 goes to block 34 and keeps switch S0 open and switch S1 closed and returns to the entry point of decision block 31.

If the determination of decision block 33 is negative, boost control circuit 15-1 goes to decision block 35 and determines if $V_{BAT}$ is nearly equal to $V_{BAT(max)}$. If this decision is affirmative, then boost control circuit 15-1 operates switch S0 at a reduced duty cycle and keeps switch S1 open, to reduce the amount of current through inductor L0; the algorithm then returns to the entry point of decision block 31. If the determination of decision block 35 is negative, then boost control circuit 15-1 operates switch S0 at a normal duty cycle, and keeps switch S1 open, as indicated in block 37, to allow filter capacitor C0 be charged up to $V_{hrv}$ and also to allow normal charging of battery 6.

Then boost control circuit 15-1 goes to decision block 38 and determines whether $V_{hrv}$ is less than but nearly equal to $V_{BAT}$. If this determination is affirmative, boost control circuit 15-1 maintains switch S0 open and maintains switch S1 closed, as indicated in block 39, to prevent further charging of battery 6; boost control circuit 15-1 then returns to the entry point of decision block 31. If the determination of decision block 38 is negative, the algorithm allows normal duty cycle operation of switch S0 to continue and returns to the entry point of decision block 31.

It should be understood that the flowchart of FIG. 5 is also applicable to the operation of a boost control circuit utilized to control switches S0 and S0a in FIG. 2 if switch "S1" in blocks 32, 34, and 35 is replaced by a switch "S0a".

Figure 4:
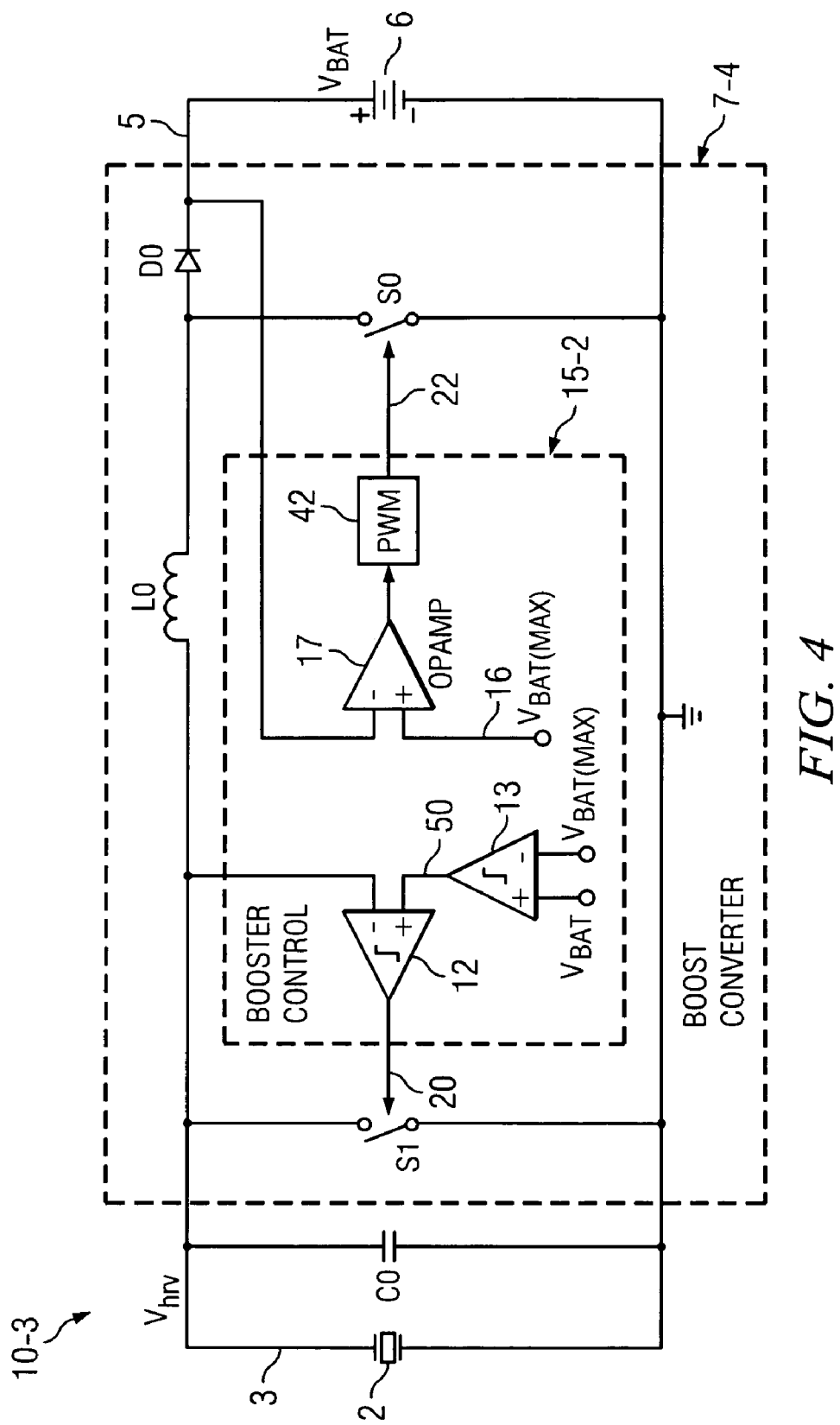
FIG. 4 is a more detailed diagram of the circuitry shown in FIG. 3.

FIG. 4 shows a circuit 10-3 which is the same as circuit 10-2 in FIG. 3, but with further detail in booster control circuit 15-2. Booster control circuit 15-2 includes a comparator 12 having its (−) input connected to receive $V_{hrv}$ on conductor 3 and its (+) input coupled to receive, via conductor 50, the output of a comparator 43 having its (+) input coupled to $V_{BAT}$ and its (−) input coupled to receive $V_{BAT(max)}$. The output of comparator 12 is connected by conductor 20 to the control terminal of switch S1. An amplifier 17 has its (−) input coupled to receive the present battery voltage $V_{BAT}$ on conductor 5 and its (+) input coupled to receive the reference voltage $V_{BAT(max)}$ on conductor 16. The output of amplifier 17 can be connected to the input of a conventional pulse width modulation (PWM) circuit 42, the output of which is connected by conductor 22 to the control terminal of switch S0. PWM circuit 42 controls the duty cycle of switch S0 in response to the output voltage generated by amplifier 17 so as to decrease the duty cycle of switch S0 as $V_{BAT}$ gets closer to $V_{BAT(max)}$. PWM circuit 42 typically, but not always, is coupled to receive a clock signal (not shown) of a suitable frequency.

The described invention provides improved reliability of energy harvesting systems by providing simple, economical battery overcharge protection, and also by avoiding damage to inductors and/or other circuit components in power management circuits of the energy harvesting systems.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. An energy harvesting system comprising:
   (a) an energy harvester for generating a harvested voltage;
   (b) an energy management circuit for converting the harvested voltage to an output voltage, the energy management circuit including an inductor having a first terminal coupled to receive the harvested voltage and a second terminal coupled to a first terminal of a first switch;
   (c) an energy storage device coupled to receive the output voltage; and
   (d) protection circuitry in the energy management circuit for shunting current generated by the energy harvester away from the energy storage device if the energy storage device is fully charged.

2. The energy harvesting system of claim 1 wherein the energy management circuit includes a control circuit coupled to a control terminal of the first switch.

3. The energy harvesting system of claim 2 wherein the energy management circuit includes a second switch coupled in parallel with the energy harvester to perform the shunting, the second switch having a control terminal coupled to the control circuit to control the shunting.

4. The energy harvesting system of claim 3 wherein a first terminal of the second switch is coupled to a first reference voltage, a second terminal of the second switch is coupled to a first terminal of a current-limiting resistor, and a second terminal of the current-limiting resistor is coupled to the first terminal of the inductor.

5. The energy harvesting system of claim 1 including a filter capacitor coupled in parallel with the energy harvester.

6. The energy harvesting system of claim 1 wherein the energy management circuit includes a rectifying element coupled between the second terminal of the inductor and the output voltage.

7. The energy harvesting system of claim 6 wherein the energy management circuit includes a boost converter.

8. The energy harvesting system of claim 4 wherein the control circuit is coupled to receive the harvested voltage and the output voltage and operates to compare the output voltage to a maximum energy storage device reference voltage to determine whether the energy storage device is fully charged, and also operates to maintain the first switch open and the second switch closed to shunt the current generated by the energy harvester away from the inductor and the energy storage device if the energy storage device is fully charged.

9. The energy harvesting system of claim 8 wherein the control circuit operates to compare the harvested voltage to the output voltage, maintain the second switch open, and operate the first switch so as to effectuate boosting of the harvested voltage by the energy management circuit if the harvested voltage is less than the output voltage.

10. The energy harvesting system of claim 9 wherein the control circuit operates to maintain the first and second switches open if the harvested voltage is less than the output voltage and the energy storage device is less than fully charged.

11. The energy harvesting system of claim 4 wherein the control circuit includes a comparator having a first input coupled to receive the harvested voltage, a second input coupled to receive a voltage indicating that the energy storage device is fully charged, and an output coupled to the control terminal of the second switch, and wherein the control circuit includes an amplifier having a first input coupled to receive the output voltage, a second input coupled to receive the maximum energy storage device reference voltage, and an output coupled by means of a pulse width modulation circuit to the control terminal of the first switch.

12. The energy harvesting system of claim 2 wherein the energy management circuit includes a second switch coupled in parallel with the first switch to perform the shunting, the second switch having a control terminal coupled to the control circuit to control the shunting, wherein a first terminal of the second switch is coupled to a first reference voltage and a second terminal of the second switch is coupled to the second terminal of the inductor.

13. The energy harvesting system of claim 12 wherein a current-limiting resistor couples the second terminal of the second switch to the second terminal of the inductor, and wherein the control circuit is coupled to receive the harvested voltage and the output voltage and operates to compare the output voltage to a maximum energy storage device reference voltage to determine whether the energy storage device is fully charged, and also operates to maintain the first switch open and the second switch closed to shunt the current generated by the energy harvester away from the energy storage device if the energy storage device is fully charged.

14. The energy harvesting system of claim 13 wherein the control circuit operates to compare the harvested voltage to the output voltage, and maintains the second switch open and operates the first switch so as to effectuate boosting of the harvested voltage by the energy management circuit if the harvested voltage is less than the output voltage.

15. A method for harvesting energy from an energy harvester to generate a harvested voltage, the method comprising:
   (a) converting the harvested voltage to an output voltage applied to an energy storage device by means of an energy management circuit including an inductor having a first terminal coupled to receive the harvested voltage and a second terminal coupled to a first terminal of a first switch;
   (b) transferring current generated by the energy harvester to the energy storage device by means of the energy management circuit if the energy storage device is not fully charged; and
   (c) shunting the current generated by the energy harvester away from the energy storage device to avoid overcharging the energy storage device if it is fully charged.

16. The method of claim 15 including shunting the current generated by the energy harvester away from the inductor.

17. The method of claim 15 wherein step (c) includes coupling the first terminal of the inductor through a current-limiting resistor and a second switch coupled in parallel with the energy harvester to a reference voltage.

18. The method of claim 15 wherein step (c) includes coupling a second terminal of the inductor through a current-limiting resistor and a second switch to a reference voltage.

19. The method of claim 17 including operating a control circuit to maintain the first switch open and the second switch closed if the harvested voltage is greater than the output voltage.

20. A system for harvesting energy from an energy harvester to generate a DC harvested voltage, the system comprising:

(a) means for converting the harvested voltage to an output voltage applied to an energy storage device by means of an energy management circuit including an inductor having a first terminal coupled to receive the harvested voltage and a second terminal coupled to a first terminal of a first switch;

(b) means for transferring current generated by the energy harvester to the energy storage device by means of the energy management circuit if the energy storage device is not fully charged; and (c) means for shunting the current generated by the energy harvester away from the energy storage device to avoid overcharging the energy storage device if it is fully charged.

* * * * *